United States Patent [19]

Ruegg et al.

[11] Patent Number: 5,387,407
[45] Date of Patent: Feb. 7, 1995

[54] PROCESS FOR THE RECOVERY OF AMMONIA FROM FLUE GASES

[75] Inventors: Hans Ruegg, Wohlen; Rene Vock, Bonstetten, both of Switzerland

[73] Assignee: Von Roll AG, Geralafingen, Switzerland

[21] Appl. No.: 521,513

[22] Filed: May 8, 1990

[30] Foreign Application Priority Data

Aug. 9, 1988 [CH] Switzerland .................. 3365/88

[51] Int. Cl.⁶ .................. C01B 21/00; C01C 1/00; C01C 1/02
[52] U.S. Cl. .................. 423/352; 423/235; 423/356; 423/357
[58] Field of Search .................. 423/238, 235, 235 D, 423/352, 356, 357

[56] References Cited

U.S. PATENT DOCUMENTS

| | | |
|---|---|---|
| 4,911,900 | 3/1990 | Horch et al. .................. 423/235 |
| 5,069,886 | 12/1991 | Frey et al. .................. 423/235 |

FOREIGN PATENT DOCUMENTS

| | | | |
|---|---|---|---|
| 3707446 | 9/1988 | Germany | 423/235 |
| 55-15426 | 4/1980 | Japan | 423/238 |

*Primary Examiner*—Wayne Langel
*Attorney, Agent, or Firm*—EGLI International

[57] ABSTRACT

For reducing nitrogen oxides in the flue gases of a firing plant, fresh ammonia water, i.e. an aqueous solution of ammonia ($NH_3$), is introduced into the flue gas flow. For achieving a high degree of separation of the nitrogen oxide a superstoichiometric addition of ammonia ($NH_3$) is necessary. Most of the excess ammonia is washed out in the wet washer (6). A liquor, e.g. milk of lime ($Ca(OH)_2$), is dosed into the wash water in a connecting line (10) to a stripping column (11), so that a pH-value above 9.5 is obtained. The now physically dissolved ammonia ($NH_3$) is desorbed from the wash water in the stripping column (11). The steam/ammonia mixture passing out of the stripping column (11) is condensed in a condenser (17) and the condensate in the form of ammonia water is admixed to the fresh ammonia water in feed line (3). As a function of the nitrogen oxide reduction, approximately 10 to 50% of the fresh ammonia water can be saved.

15 Claims, 1 Drawing Sheet

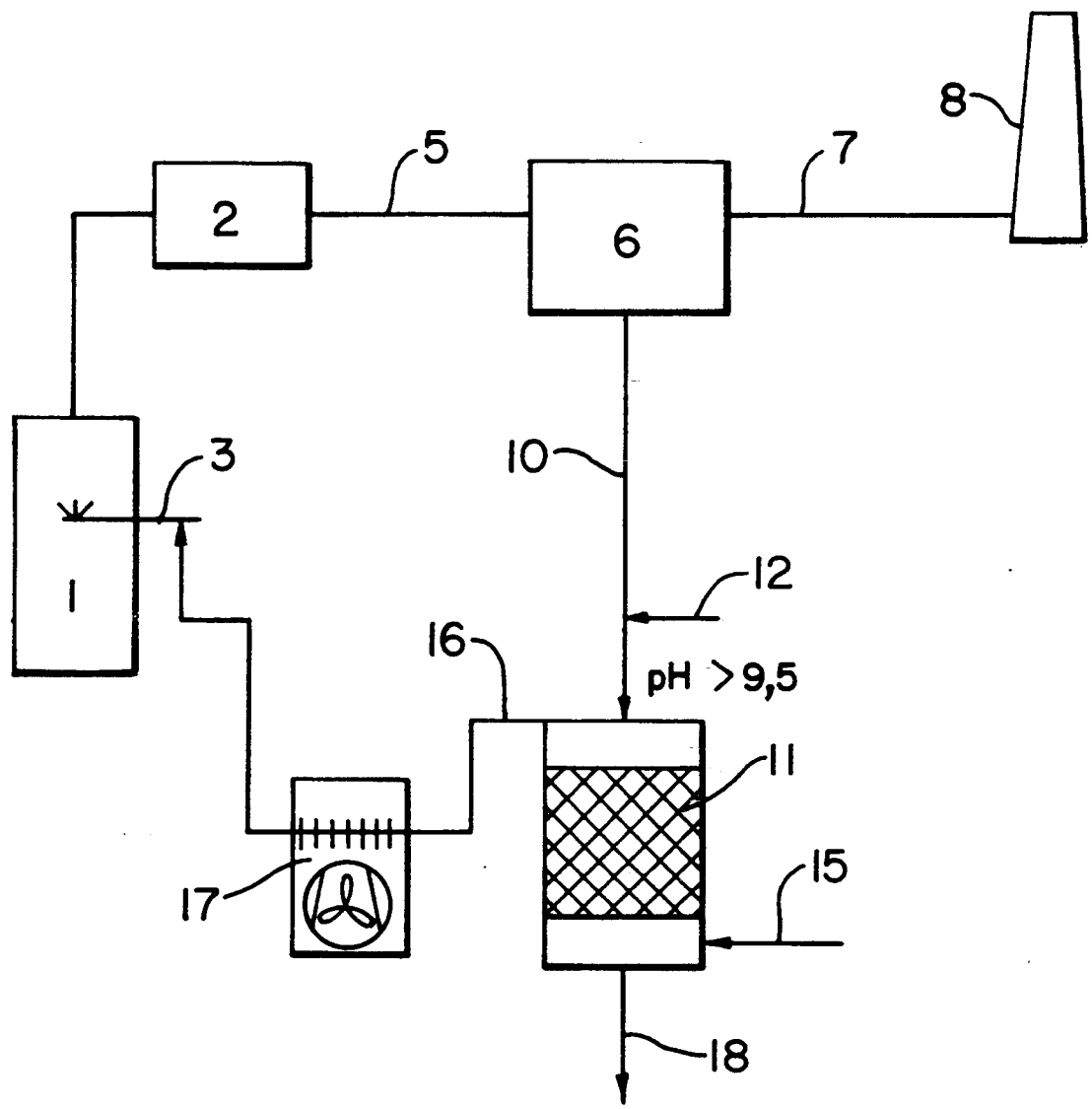

PROCESS FOR THE RECOVERY OF AMMONIA FROM FLUE GASES

This is a continuation of International Application PCT/CH89/00163, filed on May 9, 1989, which designated the United States and is now abandoned.

BACKGROUND OF THE INVENTION

The invention relates to a process for the recovery of ammonia during the separation of nitrogen oxides from the flue gases produced in a firing plant during the combustion of materials, particularly fossil fuels. A reducing gas, preferably ammonia, is introduced into the flue gas flow in a reaction zone and as a result the nitrogen oxide gases are reduced to elementary nitrogen. The flue gas flow then undergoes washing, which is performed following the reaction phase. As a result of the wash water, the unreacted ammonia or ammonium salts, referred to as slip, are removed and subsequently the pH-value of the wash water enriched by ammonia and ammonium during the washing of the flue gases is raised to above 9.5 by introducing a liquor.

A process of the aforementioned type is known from the Applicant's EP-A-264 041. In this process, the ammonia dissolved in the wash water is desorbed in a further process stage and expelled from the wash water as gas. For this purpose an intimate contact is brought about between the wash water and the air by air introduced into a stripping column, so that the ammonia is transferred from the wash water into the air. This air-ammonia mixture can then be fed as combustion air into the firing plant, e.g. in the form of secondary air in refuse incineration plants and specifically into the flue gases.

This process is based on the idea that the reduction of nitrogen oxides in flue gases can be improved by the introduction of ammonia gas into the latter, as occurs in the known SNCR process (EP-A-79 171) or the known SCR process (U.S. Pat. No. 3,970,739), if it is possible to reduce the non-reacting ammonia proportion on increasing the degree of separation. This is brought about in the known process in that the flue gases are washed and the pH-value of the ammonium ion-enriched wash water is raised to a value higher than 10, e.g. by adding lime, so that the $NH_4^+$ ion absorbed and dissolved in the wash water of the wet washer or scrubber is converted by this neutralization into free, physically bound ammonia $NH_3$. The free ammonia mixed with air passing out of the stripping column is sucked in by a blower, mixed with ambient air and blown as secondary air into the boiler.

Although this process makes it possible to achieve a high nitrogen oxide separation level with a simultaneously lower ammonia consumption, it means that the recovered ammonia can only partly be reused for the reduction of nitrogen oxides. This applies if the combustion plant is operated with air and if the secondary air is supplied at a point of secondary air injection where there are temperatures below 1000° C. As a result of the high oxygen amount made available after the secondary air injection point, a considerable proportion of the ammonia burning cannot be avoided. If the temperatures are even higher, all the ammonia can burn, so that additional nitrogen oxides are produced with which the flue gases are additionally burdened.

SUMMARY OF THE INVENTION

The object of the present invention is to so further develop the process of the aforementioned type that a high nitrogen oxide separation level is achieved, whilst additionally reducing the ammonia consumption.

According to the invention this problem is solved in that the physically dissolved ammonia which has become free by neutralization in the wash water is desorbed from the latter. As a result the ammonia $NH_3$ is brought into a form, which can be injected into the furnace at temperatures below approximately 1000° C., independently of the secondary air. Desorption can be brought about with different means. The ammonia is preferably desorbed from the wash water by stripping with steam.

The steam/ammonia mixture desorbed from the wash water is appropriately condensed and the condensate obtained as ammonia water is introduced into the reduction zone of the firing plant.

The invention also relates to a firing plant with a furnace, a boiler and a wet washer or scrubber for the flue gases for the recovery of ammonia during the separation of nitrogen oxides from the flue gases produced during the combustion of fossil fuels and other materials, the function of the plant being to permit an optimum recovery of ammonia during the separation of nitrogen oxides from the flue gases, whilst reducing the amount of reducing agent required.

According to the invention this problem is solved in that in the furnace or boiler or boiler discharge line is provided with a feed line for introducing ammonia water into the flue gas flow and a wet washer for the flue gases connected downstream of this feed line. The wet washer is connected by a connecting line to a stripping column, into which issues a steam feed line and to which a discharge line for a steam/ammonia mixture is connected, said discharge line issuing into the feed line for the introduction of the ammonia water.

Appropriately a condenser is provided in the discharge line between the stripping column and the feed line for the introduction of fresh ammonia water into the furnace.

BRIEF DESCRIPTION OF THE DRAWINGS

An embodiment of a plant according to the invention is diagrammatically shown in the drawing and is described hereinafter. The drawing shows the components and connections required for such a plant in block diagram form.

DESCRIPTION OF THE PREFERRED EMBODIMENTS

The plant shown in the drawing has a furnace 1, to which is connected a boiler 2. Into the furnace 1 issues a feed line 3, by which ammonia water, an aqueous solution of ammonia $NH_3$, is introduced into the flue gas flow. However, the feed line 3 can also issue into boiler 2. It is important that the feed line is positioned where the flue gas temperature is not too high, otherwise the ammonia is at least partly burned and supplies additional nitrogen oxide. The optimum temperature is below 1000° C. A discharge line 5 passing out of boiler 2 issues into a flue gas wet washer 6. As a high nitrogen oxide separation level is only achieved by a super-stoichiometric addition of ammonia, the excess ammonia forms a relatively high slip. This ammonia is washed out in the wet washer 6, where it immediately passes into its ionized form $NH_4^+$ in the acid wash water. An excess ammonia residue passes with the flue gases from the wet washer 6 through a line 7 into a stack 8. Optionally a special separating stage may have to be provided for this part of the flue gases.

The ammonium ions contained in the wash water are supplied to a stripping column 11 by connecting line 10. Into the latter issues a feed line 12, through which a liquor, e.g. milk of lime $Ca(OH)_2$ is dosed into the wash water.

The wash water which has been raised to a higher pH is heated to boiling by steam in the stripping column 11, said steam being introduced into the latter through a steam feed line 15. In the case of an additional steam supply, the steam forms a carrier medium for the ammonia. The steam/ammonia mixture formed rises in the stripping column 11 and is drained off at the upper end thereof through a mixture line 16 and is supplied to a condenser 17, e.g. an air condenser, where the mixture is again transferred into the liquid aggregate state. The condensate in the form of ammonia water which, as a function of the nitrogen oxide reduction in the flue gases contains approximately 10 to 50% by weight of the ammonia quantity necessary for removing the nitrogen from the flue gases, is fed into the feed line 3, i.e. at the same point at which the freshly supplied ammonia water is dosed into the combustion chamber of the furnace 1 or into the boiler 2.

As a result of the described plant, the recovered ammonia is not largely burnt as in the previously described, known plant and can instead be substantially completely used for reducing the ammonia water consumption.

The plant shown diagrammatically in the drawing is based on the prerequisite that it is used with the SNCR process. It is clearly also possible to use the ammonia recovery in the aforementioned manner in a plant using the SCR process.

We claim:

1. Process for the recovery of ammonia during the separation of nitrogen oxides ($NO_x$) from the flue gases produced during the combustion of materials, including fossil fuels in a firing plant, comprising the steps of:
   feeding an aqueous solution of ammonia ($NH_3$) into a flue gas flow in a reaction zone so that nitrogen oxide gases is reduced to elementary nitrogen ($N_2$);
   washing the flue gas flow after a reaction phase in a wet washer so that unreacted ammonia or ammonium salt is removed from the flue gas flow, resulting in an enriched wash water;
   raising the pH value of the enriched wash water to above 9.5 by introducing a liquor; and
   desorbing the physically dissolved ammonia ($NH_3$) which has become free in the enriched wash water through its neutralization for recovery of the ammonia ($NH_3$).

2. Process according to claim 1, characterized in that the ammonia is desorbed from the wash water by stripping with steam.

3. Process according to claim 2, characterized in that the steam/ammonia mixture desorbed from the wash water is condensed and the condensate obtained in the ammonia water is introduced into the reduction zone of the firing plant.

4. Process according to claim 1, characterized in that the milk of lime ($Ca(OH)_2$) is introduced as liquor into the wash water to remove the ammonia ($NH_3$) from the latter.

5. Process according to claim 3, characterized in that the ammonia water obtained from the wash water is introduced into the firing plant at the point at which fresh ammonia water is dosed, whilst subsequently reducing the quantity thereof in accordance with the ammonia water obtained from the wash water.

6. Process according to claim 3, characterized in that the ammonia water is introduced into the firing plant at a point where the temperature is below 1000° C.

7. Process for the recovery of ammonia ($NH_3$) during the separation of nitrogen oxides ($NO_x$) from flue gases produced during the combustion of materials, particularly fossil fuels in a firing plant, comprising the steps of:
   feeding an aqueous solution of ammonia ($NH_3$) into a flue gas in a reaction zone for reducing harmful nitrogen oxide gases in the flue gas to elementary nitrogen ($N_2$);
   washing the flue gas flow in a wet washer for removing unreacted ammonia ($NH_3$) or ammonium salt from the flue gas to form an enriched wash water;
   raising the pH value of the enriched wash water to above 9.5 by introducing a lime compound;
   heating the enriched wash water with steam in a stripping column so that the ammonia is released from the wash water forming a steam/ammonia mixture; and
   condensing the steam/ammonia mixture in a condenser to form a condensate in the form of an ammonia water, which is fed back into the flue gas in the reaction zone.

8. Process according to claim 7, wherein the step of desorbing includes stripping with steam the ammonia ($NH_3$) from the enriched wash water.

9. Process according to claim 8, wherein the process further comprises the steps of
   condensing a steam/ammonia mixture desorbed from the enriched wash water, and
   introducing said condensate obtained in the form of an ammonia water into a reduction zone of the firing plant.

10. Process according to claim 7, wherein the step of raising includes introducing a milk of lime ($Ca(OH)_2$) as liquor into the enriched wash water to remove the ammonia ($NH_3$) from the latter.

11. Process according to claim 9, wherein the step of introducing further includes introducing the ammonia water obtained from the enriched wash water into the firing plant at the point at which fresh ammonia water is dosed, whilst subsequently reducing the quantity thereof in accordance with the ammonia water obtained from the wash water.

12. Process according to claim 9, wherein the step of introducing includes introducing the ammonia water into the firing plant at a point where the temperature is below 1000° C.

13. Process for the recovery of ammonia ($NH_3$) during the separation of nitrogen oxides ($NO_x$) from flue gases produced during the combustion of materials, particularly fossil fuels in a firing plant, comprising the steps of:
   feeding an aqueous solution of ammonia ($NH_3$) into a flue gas in a reaction zone so that nitrogen oxide gases are reduced to elementary nitrogen ($N_2$);
   washing the flue gas after a reaction phase in a wet washer (6) so that unreacted ammonia or ammonium salt is removed from the flue gas, forming an enriched wash water having ammonia ($NH_3$) and ammonium ($NH_4$);

raising the pH value of the enriched wash water to above 9.5 by introducing a milk of lime (Ca(OH)$_2$);

stripping with steam in a stripping column (11) the physically dissolved ammonia (NH$_3$) which has become free in the enriched wash water;

condensing in a condenser (17) a steam/ammonia mixture stripper from the enriched wash water; and introducing a condensate of ammonia water which contains in the range of 10 to 50% by weight of ammonia quantity necessary for removing nitrogen oxides from the flue gas when fed into a reduction zone of the firing plant.

14. Process according to claim 13, wherein the step of introducing further includes introducing the ammonia water obtained from the enriched wash water into the firing plant at the point at which fresh ammonia water is dosed, whilst subsequently reducing the quantity thereof in accordance with the ammonia water obtained from the wash water.

15. Process according to claim 13, wherein the step of introducing includes introducing the ammonia water into the firing plant at a point where the temperature is below 1000° C.

* * * * *